(12) United States Patent
Nakhkoob Niasar

(10) Patent No.: US 10,861,252 B2
(45) Date of Patent: Dec. 8, 2020

(54) AIRCRAFT MAINTENANCE AND AIRCRAFT RELIABILITY ENGINEERING SOFTWARE SYSTEM

(71) Applicant: Massoud Nakhkoob Niasar, Tehran (IR)

(72) Inventor: Massoud Nakhkoob Niasar, Tehran (IR)

(*) Notice: Subject to any disclaimer, the term of this patent is extended or adjusted under 35 U.S.C. 154(b) by 433 days.

(21) Appl. No.: 15/877,650

(22) Filed: Jan. 23, 2018

(65) Prior Publication Data
US 2019/0228594 A1   Jul. 25, 2019

(51) Int. Cl.
| | |
|---|---|
| *G07C 5/00* | (2006.01) |
| *G07C 5/08* | (2006.01) |
| *B64D 45/00* | (2006.01) |
| *B64F 5/60* | (2017.01) |
| *G06Q 10/00* | (2012.01) |
| *G06F 30/20* | (2020.01) |
| *G06F 111/10* | (2020.01) |

(52) U.S. Cl.
CPC ............. *G07C 5/006* (2013.01); *B64D 45/00* (2013.01); *B64F 5/60* (2017.01); *G06F 30/20* (2020.01); *G06Q 10/00* (2013.01); *G07C 5/085* (2013.01); *B64D 2045/0085* (2013.01); *G06F 2111/10* (2020.01)

(58) Field of Classification Search
CPC ......... G07C 5/006; G07C 5/085; G06F 30/20; G06F 2111/10; G06F 30/15; G06Q 10/00; G06Q 10/20; B64D 45/00; B64D 2045/0085; B64F 5/60
See application file for complete search history.

(56) References Cited

U.S. PATENT DOCUMENTS

| | | |
|---|---|---|
| 7,167,786 B2 | 1/2007 | Sinex |
| 7,860,618 B2 | 12/2010 | Brandstetter |
| 8,340,948 B1 | 12/2012 | Song |
| 8,688,419 B2 | 4/2014 | Saintis |

(Continued)

OTHER PUBLICATIONS

Schallert, Integrated Safety and Reliability Analysis Methods for Aircraft System Development using Multi-Domain Object-Oriented Models, Jul. 14, 2015, pp. 1-209.

(Continued)

*Primary Examiner* — Thomas Ingram
(74) *Attorney, Agent, or Firm* — Summit Patent Group

(57) ABSTRACT

A comprehensive software system and a method for performing a comprehensive reliability analysis of an aircraft are provided. For example, an aircraft systems database is analyzed to extract information corresponding to an aircraft. A plurality of goodness-of-fit tests may be performed based upon the information using a plurality of statistics and a plurality of significance levels to generate a plurality of results of the plurality of goodness-of-fit tests. The plurality of results may be analyzed to determine a distribution model associated with a fit establishing a criteria. The distribution model may be applied to the information to determine a set of reliability indexes. A reliability report may be generated for a part of the aircraft based upon the set of reliability indexes. Maintenance of the part of the aircraft may be facilitated based upon the reliability report and/or illustrations generated based upon the set of reliability indexes.

20 Claims, 9 Drawing Sheets

(56) References Cited

U.S. PATENT DOCUMENTS

| | | | |
|---|---|---|---|
| 10,592,871 B2* | 3/2020 | Roberts, III | G07C 5/006 |
| 2010/0030807 A1 | 2/2010 | Topping | |
| 2017/0088290 A1 | 3/2017 | Szoto | |
| 2017/0233105 A1 | 8/2017 | Vali | |
| 2018/0335772 A1* | 11/2018 | Gorinevsky | G05B 23/0283 |

OTHER PUBLICATIONS

Tiassou, Aircraft operational reliability—A Model-based approach and case studies, Feb. 6, 2013, pp. 1-181, INSA de Toulouse, Toulouse, France.

Kiyak, The Effects of Aircraft Preventive Maintenance on Reliability, International Journal of Applied Mathematics and Informatics, Jan. 6, 2012, pp. 9-16, vol. 6, Issue 3, 2012.

Johansson, On System Safety and Reliability Methods in Early Design Phases, 2013, pp. 1-80, Thesis No. 1600, LiU-Tryck, Linkoping, Sweden.

Oliveira, Developing a reliability program for maintenance and operation, pp. 1-10, Instituto Superior Técnico—Departamento de Engenharia Aeroespacial Avenida Rovisco Pais, Lisboa, Portugal.

Vieira, The Application of Reliability Methods for Aircraft Design Project Management, American Journal of Industrial and Business Management, Sep. 27, 2016, pp. 967-992, vol. 6.

Pettit, General Aviation Aircraft Reliability Study, 2001, pp. 1-113, NASA Langley Research Center, Virginia, USA.

Amborski, Calculation of Alert Levels for Reliability Analysis, 23rd European Conference on Modeling and Simulation, Jun. 9, 2009, pp. 656-659, Madrid, Spain.

Marušić, Optimizing Maintenance Reliability Program for Small Fleets, Transport Journal, May 2, 2007, pp. 174-177, vol. 22, Issue 3, 2007.

Relex Reliability Software, http://www.datsi.fi.upm.es/~rail/new/WP2/Relex/Relex.htm.

* cited by examiner

AIRCRAFT MAINTENANCE AND AIRCRAFT RELIABILITY ENGINEERING SOFTWARE SYSTEM

BACKGROUND

In order to facilitate and support maintenance of aircrafts, identify hazardous parts of the aircrafts, and increase safety of aircraft passengers on board, it is necessary to determine reliability indexes of aircraft parts. However, determining the reliability indexes of these parts may require very complex calculations and processes, and thus it may be difficult to determine the reliability indexes of each part of the aircrafts manually for each type of aircraft.

SUMMARY

In accordance with the present disclosure, one or more devices and/or methods for performing a comprehensive reliability analysis of an aircraft are provided. In an example, an aircraft systems database is analyzed to extract information corresponding to an aircraft. A plurality of goodness-of-fit tests are performed based upon the information using a plurality of statistics and a plurality of significance levels to generate a plurality of results of the plurality of goodness-of-fit tests. The plurality of results may be analyzed to determine a distribution model associated with a fit establishing a criteria. The distribution model may be applied to the information to determine a set of reliability indexes. A reliability report may be generated for a part of the aircraft based upon the set of reliability indexes. Maintenance of the part may be facilitated and supported based upon the reliability report.

In an example, an aircraft identification code corresponding to an aircraft, a part of the aircraft and a distribution model may be received. An aircraft systems database may be analyzed to extract information corresponding to the aircraft. The distribution model may be applied to the information to determine a set of reliability indexes. A reliability report for the part of the aircraft may be generated based upon the set of reliability indexes. Maintenance of the part of the aircraft may be facilitated based upon the set of reliability indexes.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

FIG. 7A is a diagram illustrating an example system for presenting a reliability report and illustrations, where a table comprising a plurality of reliability indexes and a plurality of confidence intervals corresponding to a plurality of parts of an aircraft is presented.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Scenarios

The following provides a discussion of some types of scenarios in which the disclosed subject matter may be utilized and/or implemented.

1.1. Aircraft

Figure 1:
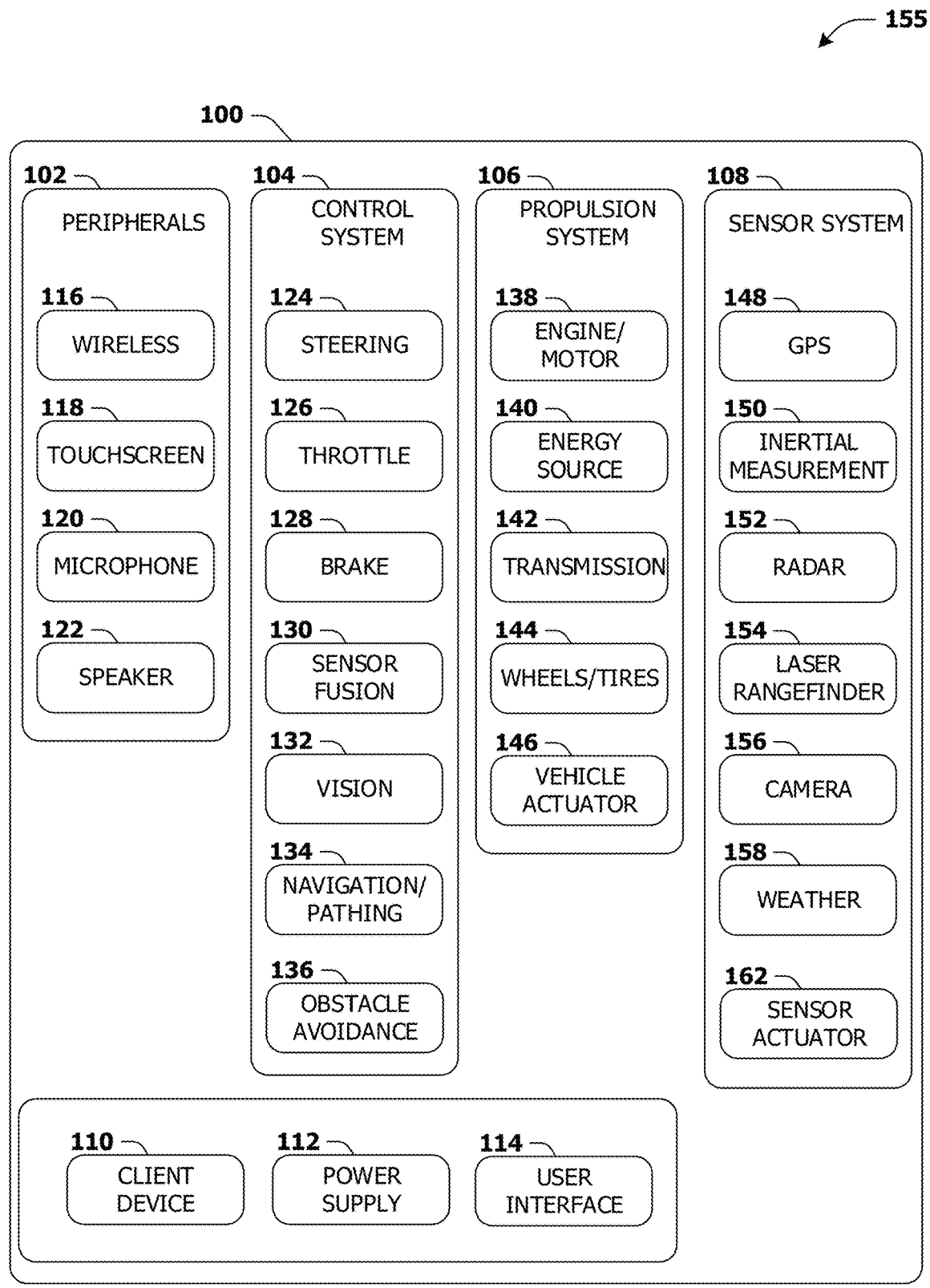
FIG. 1 is an illustration of a scenario involving an example configuration of an aircraft that may utilize and/or implement at least a portion of the techniques presented herein.

FIG. 1 presents a schematic architecture diagram 155 of an aircraft 100 that may utilize at least a portion of the techniques provided herein. The aircraft 100 may comprise or be coupled to one or more components configured to work with one other and/or with other components coupled to respective systems.

The one or more components may comprise peripherals 102, a control system 104, a propulsion system 106, a sensor system 108, a client device 110, a power supply 112 and/or a user interface 114. The client device 110 may be a controller of the aircraft 100, may be configured to receive information from and/or provide instructions to the peripherals 102, the control system 104, the propulsion system 106 and/or the sensor system 108, and/or may generate images to be displayed on the user interface 114 and/or receive inputs from the user interface 114. The power supply 112 may provide power to at least some of the components of the aircraft 100.

The peripherals 102 may comprise a wireless communication system 116, a touchscreen 118, a microphone 120, and/or a speaker 122. The wireless communication system 116 may be wirelessly coupled to one or more other aircrafts, sensors, and/or other entities, either directly or via a communication network. The touchscreen 118 may be used by a user to input commands to the aircraft 100. For example, the touchscreen 118 may be configured to sense at least one of a position and a movement of a user's finger, and/or may be capable of sensing a level of pressure applied to the touchscreen 118. The microphone 120 may be configured to receive audio (e.g., a voice command or other audio input) (e.g., from a user of the aircraft 100), while the speakers 122 may be configured to output audio (e.g., to the user of the aircraft 100).

The control system 104 may control operation of the aircraft 100 and/or one or more components of the aircraft 100, and may comprise a steering unit 124, a throttle 126, a brake unit 128, a sensor fusion algorithm 130, a computer vision system 132, a navigation or pathing system 134, and/or an obstacle avoidance system 136. The steering unit 124 may be configured to adjust the heading or direction of the aircraft 100. The throttle 126 may be configured to control the operating speed and acceleration of the engine/motor 118 and/or the speed and acceleration of the aircraft 100. The brake unit 128 may be configured to decelerate the aircraft 100 (e.g., using friction to slow the wheels/tires 124). The brake unit 128 may be configured to be regenerative and convert the kinetic energy of the wheels/tires 124 to electric current. The sensor fusion algorithm 130 may comprise an algorithm executable by the client device 110 and configured to accept data (e.g., information sensed at one or more sensors) from the sensor system 108 as an input. The sensor fusion algorithm 130 may comprise a Kalman filter, a Bayesian network, another algorithm, and/or a combination of two or more algorithms. The sensor fusion algorithm 130 may be configured to provide assessments based on the data from the sensor system 108 (e.g., evaluations of objects and/or features in an environment of the aircraft 100, evaluations of particular situations, and/or evaluations of possible impacts based on particular situations). The computer vision system 132 may be configured to process and analyze images (e.g., captured by a camera 134) to identify objects (e.g., people, other aircrafts, obstacles, etc.) and/or features (e.g., lane information, traffic signals, etc.) in the environment of the aircraft 100, map the environment, track objects, estimate speed of objects, and/or may make use of an object recognition algorithm, a Structure from Motion (SFM) algorithm, video tracking, and/or other computer vision techniques. The navigation and pathing system 134 may be configured to determine a driving path for the aircraft 100, update the driving path dynamically while the aircraft 100 is in operation, and may do so incorporate data from the sensor fusion algorithm 130, a Global Positioning System (GPS) unit 148, and/or one or more predefined maps. The obstacle avoidance system 136 may be configured to identify, evaluate, and take action to avoid or otherwise negotiate obstacles in the environment of the aircraft 100.

The propulsion system 106 may provide powered motion for the aircraft 100 and/or one or more components of the aircraft 100, and may comprise an engine/motor 138, an energy source 140, a transmission 142, wheels/tires 144 and/or vehicle actuator(s) 146. The engine/motor 138 may comprise an internal combustion engine, an electric motor, a steam engine, a Stirling engine, and/or any combination thereof. The energy source 140 may be a source of energy that powers the engine/motor 138 (e.g., at least in part), such as gasoline, diesel, other petroleum-based fuels, propane, other compressed gas-based fuels, ethanol, solar panels, batteries, other sources of electrical power, fuel tanks, batteries, capacitors, and/or flywheels. The transmission 142 may be configured to transmit mechanical power from the engine/motor 138 to the wheels/tires 144, and may comprise a gearbox, clutch, differential and/or drive shafts comprising one or more axles configured to be coupled to the wheels/tires 144. The vehicle actuator(s) 146 may be configured to modify a position and/or orientation of one or more portions of the aircraft 100. For example, the vehicle actuator(s) 146 may be configured to raise or lower a height and/or center of gravity of the aircraft 100 (e.g., by changing a pressure or other property of the wheels/tires 144, by raising or lowering at least some of a body of the aircraft 100 relative to the wheels/tires 144 and/or relative to the ground upon which the aircraft 100 is on, etc.), to open and/or close one or more channels of the aircraft 100.

The sensor system 108 may sense information about the environment of the aircraft 100 and/or one or more components of the aircraft 100, and may comprise the GPS unit 148, an inertial measurement unit (IMU) 150, a radio detection and ranging (RADAR) unit 152, a laser rangefinder and/or light detection and ranging (LIDAR) unit 154, a camera 156, a weather unit 158 and/or sensor actuator(s) 162. The GPS unit 148 may comprise a sensor (e.g., and/or a transceiver) configured to estimate a geographic location of the aircraft 100. The IMU 150 may comprise one or more sensors configured to sense attitude, position and/or orientation changes of the aircraft 100 based on inertial acceleration (e.g., using accelerometers and/or gyroscopes). The RADAR unit 152 may use radio waves to detect an object and/or determine characteristics of the object such as range, altitude, direction, and/or speed of the object by transmitting pulses of radio waves and/or microwaves that may bounce off any object in a path of the waves. The laser rangefinder and/or LIDAR unit 154 may include a sensor configured to detect objects (e.g., and determine distance to the objects and/or other properties associated with the objects) in the environment of the aircraft 100 using visible light from lasers. The camera 156 (e.g., a still camera, a video camera, etc.) may capture images of the environment of the aircraft system 100, and may be configured to detect visible light and/or light from other portions of the spectrum (e.g., infrared light, ultraviolet light, etc.). The weather unit 158 may be configured to determine one or characteristics of weather of the environment of the aircraft 100. For example, the weather unit 158 may use one or more sensors (e.g., and/or other sources) to determine whether the aircraft 100 is currently (e.g., or will soon be) subject to rain, snow, hail, etc. The sensor actuator(s) 162 may be configured to modify a position and/or orientation of one or more sensors of the sensor system 108.

1.2. Server Configuration

Figure 2:
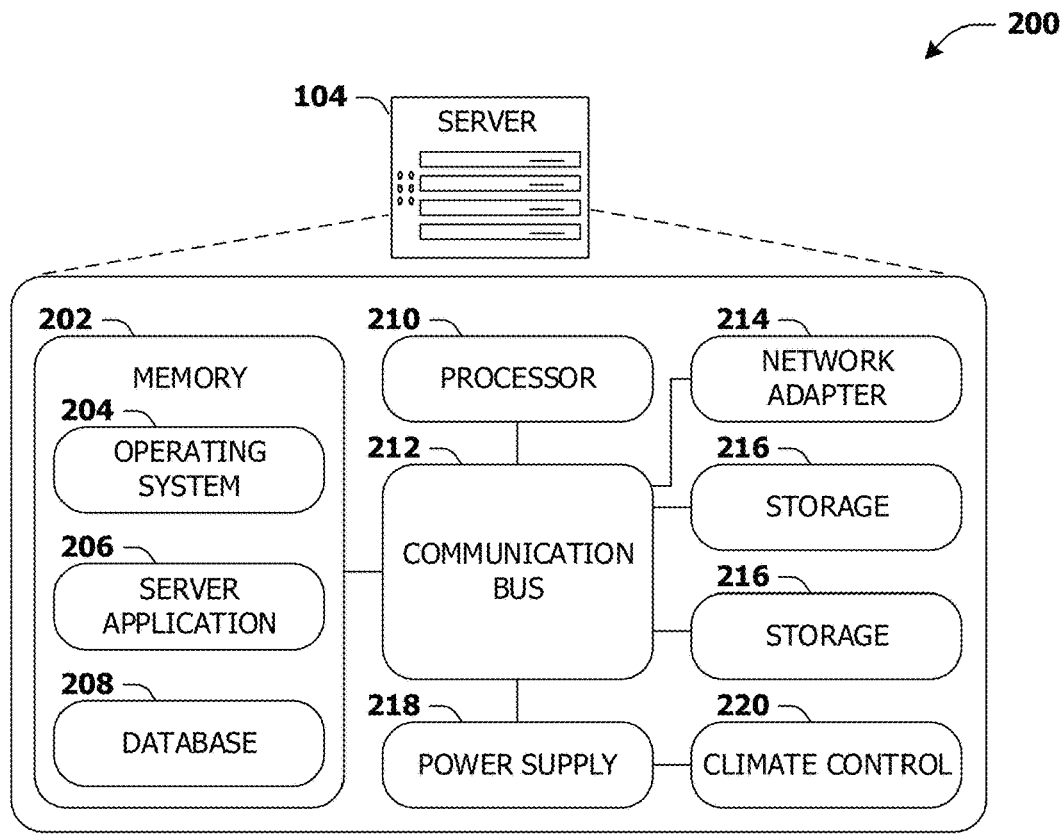
FIG. 2 is an illustration of a scenario involving an example configuration of a server that may utilize and/or implement at least a portion of the techniques presented herein.

FIG. 2 presents a schematic architecture diagram 200 of a server 109 that may utilize at least a portion of the techniques provided herein. Such a server 109 may vary widely in configuration or capabilities, alone or in conjunction with other servers, in order to provide a service such as the service 102.

The server 109 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 109 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 109 may comprise a variety of peripheral components, such as a wired and/or wireless network adapter 214 connectable to a local area network and/or wide area network; one or more storage components 216, such as a hard disk drive, a solid-state storage device (SSD), a flash memory device, and/or a magnetic and/or optical disk reader.

The server 109 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 109 with at least one other server. Other components that may optionally be included with the server 109 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 109 to a state of readiness.

The server 109 may operate in various physical enclosures, such as a desktop or tower, and/or may be integrated with a display as an "all-in-one" device. The server 109 may be mounted horizontally and/or in a cabinet or rack, and/or may simply comprise an interconnected set of components. The server 109 may comprise a dedicated and/or shared power supply 218 that supplies and/or regulates power for the other components. The server 109 may provide power to and/or receive power from another server and/or other devices. The server 109 may comprise a shared and/or dedicated climate control unit 220 that regulates climate properties, such as temperature, humidity, and/or airflow. Many such servers 109 may be configured and/or adapted to utilize at least a portion of the techniques presented herein.

1.3. Client Device Configuration

Figure 3:
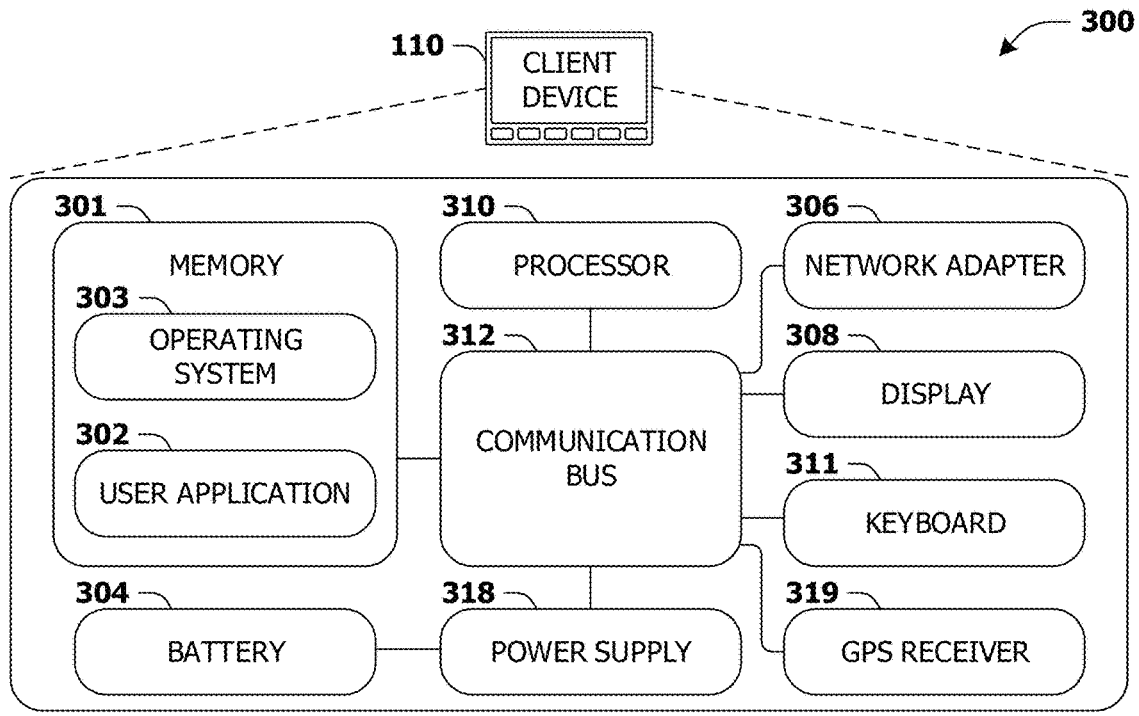
FIG. 3 is an illustration of a scenario involving an example configuration of a client device that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a GPS receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals.

For example, a locally installed webserver may provide web content in response to locally submitted web requests. Many such client devices 110 may be configured and/or adapted to utilize at least a portion of the techniques presented herein.

2. Presented Techniques

One or more computing devices and computational techniques for performing a comprehensive reliability analysis of an aircraft and monitoring parts of the aircraft are provided. Determining reliability indexes of aircrafts and/or parts of the aircrafts is necessary to ensuring safety of usage of the aircrafts. However, determining the reliability indexes of the parts of the aircrafts may require very complex calculations and processes. Thus, it may be difficult and may take a long period of time to determine reliability indexes for each part of each type of aircraft. Thus, in accordance with the one or more techniques presented herein, the reliability indexes of parts of different types of aircrafts may be determined automatically and non-automatically based upon various inputs corresponding to an aircraft, one or more parts of the aircraft and a failure time distribution model (e.g., to be applied to information corresponding to the aircraft systems). In some examples, the one or more techniques and the computing devices may be used by airliners, civil aviation authorities, aircraft maintenance companies, aircraft designers, aircraft manufacturers, aerospace research institutes, etc. in order to determine reliability indexes of parts of various types of aircrafts.

Figure 4A:
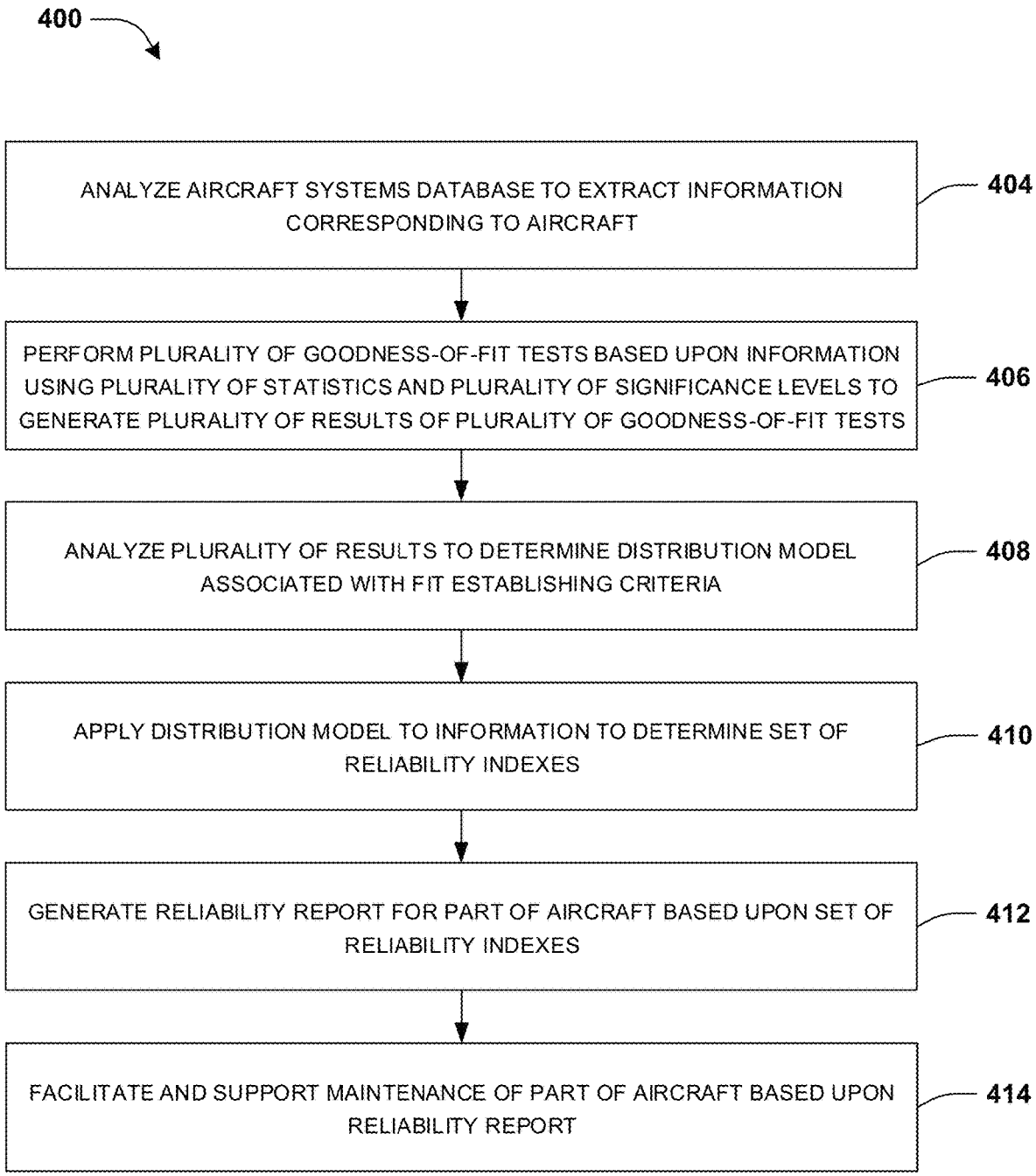
FIG. 4A is a flow chart illustrating an example method for performing a comprehensive reliability analysis of an aircraft.

An embodiment for performing a comprehensive reliability analysis of an aircraft is illustrated by an example method 400 of FIG. 4A. In some examples, the comprehensive reliability analysis may be performed using a software system named Aircraft Reliability Engineering Software System (ARESS) developed based upon probability and statistical methods comprising reliability theory. In some examples, the comprehensive reliability analysis may be performed in an automatic mode (e.g., wherein one or more failure time distribution models, parts of the aircraft, etc. may be automatically selected) named Automatic Reliability Data Analysis (ARDA). The aircraft may be a type of commercial transport aircraft, general aviation aircraft, sea plane, special purpose aircraft, etc. In some examples, an aircraft identification code (e.g., registration number) corresponding to the aircraft (e.g., and/or corresponding to an aircraft model) may be selected. The aircraft identification code may be received via a selection of the aircraft identification code from a list of aircraft identification codes (e.g., and/or a list of aircraft models) corresponding to aircraft types. In some examples, an option for performing the comprehensive reliability analysis in the automatic mode or non-automatic mode may be received via a selection of the automatic or the non-automatic mode by selecting a menu item from a main menu system. For example, the main menu system comprising reliability analysis modes comprising "ARDA" corresponding to the automatic mode and "NARDA" corresponding to a non-automatic mode may be presented. In some examples, the automatic mode may be selected and/or received.

Accordingly, at 404, an aircraft systems database may be analyzed to extract information corresponding to the (e.g., selected) aircraft. In some examples, the aircraft systems database may be managed, maintained and edited using a data management unit (DMU). The aircraft systems database may comprise a plurality of aircraft system identification codes (e.g., registration numbers) corresponding to a plurality of aircraft systems, a plurality of sets of aircraft information and a plurality of sets of failure times corresponding to a plurality of parts. Each aircraft identification code of the plurality of aircraft identification codes may be linked to an aircraft, a plurality of systems associated with the aircraft, a plurality of parts associated with the aircraft. Each aircraft identification code of the plurality of aircraft identification codes may further be linked to relevant information (e.g., failure times), the plurality of systems and/or the plurality of parts. The relevant information may comprise past failure times associated with the plurality of parts. In some examples, the failure times may comprise merely numerical data. In some examples, the plurality of parts may comprise a plurality of sub-systems, a plurality of modules and/or a plurality of components of the aircraft.

In some examples, the plurality of aircraft identification codes, the plurality of sets of specifications and the plurality of sets of aircraft information may be based upon a plurality of inputs and aircraft documentation (e.g., Air Transport Association (ATA) chapters, Airlines for America (A4A) documentation, original equipment manufacturer documentation and other documentation associated with the plurality of aircraft systems). For example, the plurality of inputs may be received via a plurality of single-line textboxes in a graphical user interface (GUI) displayed to a user. Additionally, the plurality of inputs may be received via a plurality of selections from lists. For example, lists presented via combo boxes may be presented in the GUI corresponding to sets of aircraft information corresponding to the aircraft.

In some examples, the aircraft systems database may not comprise a specific aircraft type corresponding to a second aircraft. In some examples, in order to add (e.g., register) the second aircraft of a the specific aircraft type into the aircraft systems database, a second aircraft identification code corresponding to the second aircraft system may be received. A plurality of specifications of the second aircraft (e.g., and/or the second aircraft type) may be retrieved from the aircraft documentation. In some examples, the plurality of specifications may comprise specifications of a second plurality of systems corresponding to the second aircraft (e.g., or the second aircraft type) and/or specifications of a second plurality of parts corresponding to the second aircraft (e.g., or the second aircraft type). In some examples, the second aircraft identification code and the plurality of specifications (e.g., corresponding to the second aircraft) may be received via a plurality of combo boxes, single-line textboxes, etc. in the GUI. In some examples, second information (e.g., comprising failure times corresponding to the second aircraft system) may be received in order to perform a second comprehensive reliability analysis of the second aircraft. In some examples, the second aircraft identification code and the plurality of specifications (e.g., corresponding to the specific aircraft type) may be stored in the aircraft systems database. Accordingly, a second plurality of aircrafts may be linked to the specific aircraft type. Responsive to receiving a third aircraft identification code corresponding to a third aircraft (e.g., of the specific aircraft type), the third aircraft may be identified as having the (e.g., same) plurality of specifications (e.g., without having to receive the plurality of specifications. In some examples, third information (e.g., comprising failure times corresponding to the third aircraft) may be received in order to perform a third comprehensive reliability analysis of the third aircraft.

In some examples, the aircraft systems database may be presented to the user via an interface. In some examples, the user may view and browse through the plurality of aircraft identification codes and the plurality of sets of aircraft information. In some examples, the interface may provide a search area that may be used to search the aircraft systems database using (e.g., different sets of) aircraft information. In some examples, the interface may provide options to edit and delete data items from the plurality of aircraft identification codes and the plurality of sets of aircraft information.

At 406, a plurality of goodness-of-fit tests may be performed based upon the information (e.g., extracted from the aircraft systems database) using a plurality of statistics and a plurality of significance levels to generate a plurality of results of the plurality of goodness-of-fit tests. In some examples, the plurality of goodness-of-fit tests may be performed by a software computational engine (SCE). The plurality of goodness-of-fit tests may be performed to select a distribution model (i.e., a failure law distribution model associated with failure law distribution) from a plurality of distribution models (i.e., failure law distribution models associated with failure law distributions). It may be appreciated that selecting the distribution model based upon the information may lead to benefits including, but not limited to, a more precise reliability analysis.

In some examples, the plurality of goodness-of-fit tests may comprise a first set of goodness-of-fit tests corresponding to a first distribution model, a second set of goodness-of-fit tests corresponding to a second distribution model and a third set of goodness-of-fit tests corresponding to a third distribution model. The first distribution model may comprise an exponential distribution, the second distribution model may comprise a Gamma distribution and the third distribution model may comprise a Weibull distribution. The SCE is configured such that (e.g., other) distribution models (e.g., failure time distribution models) may be comprised within the plurality of distribution models used in performing the plurality of goodness-of-fit tests. For example, the plurality of distribution models may comprise a fourth distribution model (e.g., Pareto distribution).

In some examples, each set of goodness-of-fit tests of the plurality of sets of goodness-of-fit tests may be performed using a plurality of significance levels (e.g., alpha levels such as 0.25, 0.15, 0.1, 0.05, 0.025, 0.01, etc.). In some examples, a significance level may correspond to a Type I error rate (e.g., probability of rejecting a null hypothesis given that is true). For example, a significance level set to 0.05 may imply that it is acceptable to have a 5% probability of incorrectly rejecting a null hypothesis. In some examples, each set of goodness-of-fit tests of the plurality of goodness-of-fit tests may comprise a plurality of statistics (e.g., D, $D^+$, $D^-$, V, A2, W2, etc.). In some examples, each set of goodness-of-fit tests may comprise a plurality of portions of goodness-of-fit tests performed using the plurality of statistics wherein each portion of goodness-of-fit tests may be performed using a statistic of the plurality of statistics and each goodness-of-fit test of each of the portions of goodness-of-fit tests may be performed using a significance level of the plurality of significance levels. For example, each set of goodness-of-fit tests may comprise a first portion of goodness-of-fit tests performed using a first statistic of the plurality of statistics, wherein each goodness-of-fit test of the first portion of goodness-of-fit tests are performed using a significance level from the plurality of significance levels (e.g., wherein a goodness-of-fit test of the first portion of goodness-of-fit tests is performed using a different significance level than other goodness-of-fit tests of the first portion of goodness-of-fit tests). Further, each set of goodness-of-fit tests may comprise a second portion of goodness-of-fit tests performed using a second statistic of the plurality of statistics, wherein each goodness-of-fit test of the second portion of goodness-of-fit tests are performed using a significance level from the plurality of significance levels (e.g., wherein a goodness-of-fit test of the second portion of goodness-of-fit tests is performed using a different significance level than other goodness-of-fit tests of the second portion of goodness-of-fit tests).

In an example, the first set of goodness-of-fit tests may comprise a first goodness-of-fit test performed with the first distribution model using a first statistic of the plurality of statistics and a first significance level of the plurality of significance levels, a second goodness-of-fit test performed with the first distribution model using the first statistic and a second significance level of the plurality of significance levels, a third goodness-of-fit test performed with the first distribution model using a first statistic of the plurality of statistics and the third significance level of the plurality of significance levels, etc. Additionally, the second set of goodness-of-fit tests may comprise a fourth goodness-of-fit test performed with the second distribution model using the first statistic and the first significance level, a fifth goodness-of-fit test performed with the second distribution model using the first statistic and the second significance level, a sixth goodness-of-fit test performed with the second distribution model using the first statistic and the third significance level, etc. Additionally, the third set of goodness-of-fit tests may comprise a seventh goodness-of-fit test performed with the third distribution model using the first statistic and the first significance level, an eighth goodness-of-fit test performed with the third distribution model using the first statistic and the second significance level, a ninth goodness-of-fit test performed with the third distribution model using the first statistic and the third significance level, etc. Accordingly, a number of goodness-of-fit tests of the plurality of goodness-of-fit tests performed may be based upon a number of statistics of the plurality of statistics and a number of significance levels of the plurality of significance levels.

In some examples, the plurality of results of the plurality of goodness-of-fit tests may correspond to a plurality of fits of the plurality of distribution models for the information. The plurality of results may comprise a first set of results based upon the first set of goodness-of-fit tests (e.g., performed using the first distribution model). Accordingly, the first set of results may be indicative of a first fit of the first distribution model for the information. Additionally, the plurality of results may comprise a second set of results based upon the second set of goodness-of-fit tests (e.g., performed using the second distribution model). Accordingly, the second set of results may be indicative of a second fit of the second distribution model for the information. Additionally, the plurality of results may comprise a third set of results based upon the third set of goodness-of-fit tests (e.g., performed using the third distribution model). Accordingly, the third set of results may be indicative of a third fit of the third distribution model for the information.

At 408, the plurality of results may be analyzed to determine a distribution model associated with a fit establishing a criteria. For example, the fit may be associated with a number of acceptances of a null hypothesis exceeding a threshold (e.g., and/or a maximum number of acceptances of the null hypothesis). For example, the first fit (e.g., corresponding to the first distribution model) associated with the first set of results, the second fit (e.g., corresponding to the second distribution model) associated with the second set of results and the third fit (e.g., corresponding to the third distribution model) associated with the third set of results may be assessed (e.g., according to numbers of acceptances of the null hypothesis across the plurality of goodness-of-fit tests). In some examples, the distribution model may be selected from the plurality of distribution models responsive to determining that the fit of the distribution model is ranked higher than one or more (e.g., other) fits. In some examples, determining that the fit of the distribution model is ranked higher than the one or more (e.g., other) fits comprises determining that the fit is associated with a maximum number of acceptances of the null hypothesis across the plurality of goodness-of-fit tests.

In an example, the first fit (e.g., corresponding to the first distribution model) may be ranked as the second highest fit responsive to determining that the first fit is associated with a second highest number of acceptances of the null hypothesis. The second fit (e.g., corresponding to the second distribution model) may be ranked as the third highest fit responsive to determining that the second fit is associated with a third highest number of acceptances of the null hypothesis. The third fit (e.g., corresponding to the third distribution model) may be ranked as the first highest fit responsive to determining that the second fit is associated with a (e.g., maximum) first highest number of acceptances of the null hypothesis (e.g., wherein the first highest number is greater than the second highest number and the third highest number). According to the example, the third distribution model may be selected.

At 410, the (e.g., selected) distribution model may be applied to the information to determine a set of reliability indexes. In some examples, the distribution model may be applied to determine the set of reliability indexes using the SCE. In some examples, an estimation method may be performed based upon the distribution model and the information to determine estimations of one or more parameters corresponding to the distribution model. In some examples, an estimated distribution model may be determined based upon the estimations of the one or more parameters. In some examples, the estimation method may comprise maximum likelihood estimation (MLE). In some examples, the set of reliability indexes may be determined based upon the estimated distribution model. For example, a second plurality of goodness-of-fit tests may be performed based upon the information and the estimated distribution model to generate a second plurality of results of the second plurality of goodness-of-fit tests. In some examples, the second plurality of goodness-of-fit tests may be performed using the plurality of statistics and the plurality of significance levels. The set of reliability indexes may comprise an estimation of a reliability index (e.g., reliability point estimation), a hazard rate, and a mean time between failures (MTBF). The estimation of the reliability index may be between 0 and 1, indicating reliability is higher as the estimation of the reliability index approaches 1. Further, a set of statistical characteristics of the plurality of distribution models may be determined based upon the estimated distribution model. The set of statistical characteristics may comprise variance, standard error, median, quantiles, mean time to failure (MTTF), and other statistical characteristics associated with the (e.g., selected) distribution model.

A set of confidence intervals of the set of reliability indexes may be computed based upon a confidence coefficient (e.g., 85%, 90%, 95%, etc.). For example, a first confidence interval may be determined for a true reliability index, a second confidence interval may be determined for a true hazard rate and a third confidence interval may be determined for a true MTBF. In some examples, the confidence coefficient may be determined automatically before beginning the comprehensive reliability analysis (e.g., the confidence coefficient may automatically be set to 90%, the confidence coefficient may automatically be set to 95%, etc.). Additionally, the confidence coefficient may be determined manually by receiving the confidence coefficient. For example, the confidence coefficient may be received via a single-line textbox in a GUI displayed to the user.

In some examples, the information extracted from the aircraft systems database and the set of reliability indexes may correspond to a first set of failures of a first part (e.g., a sub-system, a module, a component, etc.) of the aircraft. In some examples, a plurality of sets of information corresponding to a plurality of parts of the aircraft may be extracted from the aircraft systems database. In some examples, the plurality of parts of the aircraft may comprise each (e.g., every) part of the aircraft. Each set of information of the plurality of sets of information may comprise failure times corresponding to a plurality of failures comprising failures from an initial failure to a last failure occurred for each part of the plurality of parts of the aircraft. In some examples, each set of information of the plurality of sets of information merely comprises failure times corresponding to the plurality of failures of each part of the plurality of parts of the aircraft. Accordingly, a plurality of sets of reliability indexes may be determined based upon the plurality of sets of information extracted from the aircraft systems database corresponding to the plurality of failures of each part of the plurality of parts of the aircraft. In some examples, the plurality of sets of reliability indexes may be determined based upon a plurality of selected distribution models wherein each selected distribution model of the plurality of selected distribution models is dynamically selected based upon each fit of the selected distribution model for a corresponding set of information of the plurality of sets of information corresponding to the plurality of parts of the aircraft.

In an example, the information (e.g., corresponding to the first part) may correspond to the first set of failures of the first part. The first set of failures may comprise every recorded failure of the first part. In some examples, second information corresponding to a newly recorded failure of the first part of the aircraft may be extracted from the aircraft systems database (e.g., while monitoring the aircraft). An updated distribution model may be dynamically selected based upon a fit of the updated distribution model for the information and the second information. A second set of reliability indexes and/or a second set of confidence intervals (e.g., corresponding to the first set of failures and the newly recorded failure of the first part of the aircraft) may be determined based upon the updated distribution model, the information and the second information using the techniques presented herein.

Third information may correspond to a second set of failures of a second part of the aircraft system. The second set of failures may comprise every recorded failure of the second part. The aircraft systems database may be analyzed to extract the third information. A third set of reliability indexes (e.g., corresponding to the second set of failures of the second part of the aircraft) may be computed based upon the techniques presented herein. For example, a second distribution model may be dynamically selected based upon a fit of the third information. In some examples, fourth information corresponding to a newly recorded failure of the second part may be extracted from the aircraft systems database (e.g., while monitoring the aircraft). A second updated distribution model may be dynamically selected based upon a fit of the updated distribution model for the third information and the fourth information. A fourth set of reliability indexes (e.g., corresponding to the second set of failures and the newly recorded failure of the first part of the aircraft) may be determined based upon the second updated distribution model, the third information and the fourth information using the techniques presented herein.

The techniques presented herein may be repeated for each part of the plurality of parts such that reliability indexes may be computed for (e.g., every failure of) each part of the plurality of parts. Accordingly, the techniques presented herein may be repeated for a plurality of sets of parts wherein each set of parts of the plurality of sets of parts correspond to a (e.g., main) system of a plurality of systems of the aircraft. For example, the techniques presented herein may be repeated for each part of a first set of parts of the plurality of parts corresponding to a first system of the aircraft. The techniques presented herein may (e.g., then) be repeated for each part of a second set of parts of the plurality of parts corresponding to a second system of the aircraft.

At 412, a reliability report may be generated for the part of the aircraft (e.g., and/or the plurality of parts of the aircraft) based upon the set of reliability indexes (e.g., and/or the plurality of sets of reliability indexes). The reliability report may comprise the plurality of sets of reliability indexes, a plurality of sets of confidence intervals and a plurality of sets of statistical characteristics corresponding to the plurality of selected distribution models (failure time distribution models) associated with the plurality of sets of reliability indexes. In some examples, the reliability report may comprise summaries representing the plurality of sets of reliability indexes, the plurality of sets of confidence intervals and the plurality of sets of statistical characteristics of the plurality of selected distribution models.

In some examples, the reliability report may have a plurality of sections. For example, a first section of the reliability report may comprise a "General Analysis" report comprising summaries representing the plurality of selected distribution models and a plurality of estimations of the plurality of sets of reliability indexes. Additionally, a second section of the reliability report may comprise a "Modeling Analysis" report comprising information representing the selection of the plurality of selected distribution models from the plurality of distribution models and the plurality of sets of statistical characteristics. Additionally, a third section of the reliability report may comprise a "Dist. Characteristics" report comprising summaries representing the plurality of sets of statistical characteristics corresponding to the plurality of sets of distribution models. In some examples, the third section of the reliability report may comprise summaries representing a plurality of MTTFs, etc., corresponding to the plurality of sets of distribution models. Additionally, a fourth section of the reliability report may comprise a "Reliability Analysis" report comprising summaries representing a plurality of estimations of reliability indexes (e.g., reliability point estimations) corresponding to the plurality of parts and/or a first plurality of confidence intervals corresponding to the plurality of estimations of reliability indexes. Additionally, a fifth section of the reliability report may comprise a "Hazard Analysis" report comprising summaries representing a plurality of hazard rate estimations corresponding to the plurality of parts and/or a second plurality of confidence intervals corresponding to the plurality of hazard rate estimations. Additionally, a sixth section of the reliability report may comprise an "MTBF Analysis" report comprising summaries representing a plurality of MTBFs corresponding to the plurality of parts and a third plurality of confidence intervals corresponding to the plurality of MTBFs.

In some examples, the reliability report may be generated as a file that can be accessed using an external application, external software, etc. (e.g., Microsoft Excel). In some examples, the reliability report may be presented via a GUI presented using the software system used to perform at least a portion of the comprehensive reliability analysis. In some examples, illustrations (e.g., charts, tables, plots, graphs, etc.) may be generated by a monitoring component of the software system as image files (e.g., JPEG, etc.). In some examples, the illustrations may each be categorized based upon (e.g., their) corresponding parts and may be stored and/or organized within a plurality of directories corresponding to the plurality of parts, wherein each directory of the plurality of directories corresponds to a part of the plurality of parts in order to facilitate access to the illustrations.

In some examples, a plurality of sets of illustrations may be generated wherein a set of illustrations may be generated for each part of the plurality of parts of the aircraft. For example, a first set of illustrations may be generated for the first system of the aircraft. A first illustration of the first set of illustrations may comprise a chart representing a first plurality of estimations of reliability indexes corresponding to a first plurality of failures of the first part, wherein the first part is comprised within the first system. A second illustration of the first set of illustrations may comprise a chart representing a second plurality of hazard rates corresponding to the first plurality of failures of the first part. Other illustrations of the first set of illustrations may be similarly generated for other reliability indexes corresponding to the first plurality of failures of the first part and for other reliability indexes corresponding to other parts of the first set of parts of the first system. Further, other sets of illustrations of the plurality of sets of illustrations may be similarly generated for other systems of the plurality of systems of the aircraft. A number of illustrations within the plurality of sets of illustrations may be based upon a number of parts of the plurality of parts of the aircraft and a number of reliability indexes and/or statistical characteristics configured to be represented using illustrations. In an example, a number of parts of the plurality of parts may be 200, a number of reliability indexes and/or statistical characteristics configured to be represented using illustrations may be 4 (e.g., reliability point estimation, hazard rate, MTBF, MTTF). In this example, the number of illustrations generated by the software system within the plurality of sets of illustrations may be 800.

In some examples, a maintenance schedule for a part of the plurality of parts of the aircraft may be developed by a maintenance unit based upon the reliability report, the plurality of sets of reliability indexes and the plurality of sets of illustrations. For example, reliability indexes of one or more critical parts of the plurality of parts that have the potential of endangering safety of flight of the aircraft or need to receive maintenance may indicate maintenance to be performed (e.g., replacing a critical part, repairing a critical part, inspecting a critical part, servicing a critical part, etc.) on the one or more critical parts. Accordingly, the one or more critical parts may be identified and the maintenance schedule may be developed comprising details for performing maintenance on the one or more critical parts. The details may comprise a set of instructions for performing maintenance on the one or more critical parts, wherein each instruction of the set of instructions may be generated for each critical part of the one or more critical parts based upon specifications of the one or more critical parts and/or the plurality of sets of reliability indexes. The set of instructions may comprise assignments of manpower, equipment, tools, parts, etc. to the one more critical parts and/or priorities (e.g., importance, urgency, etc.) of maintenances corresponding to each instruction of the set of instructions.

In an example, a first critical part may be identified and the maintenance schedule may indicate first maintenance shall be performed on the first critical part at a first point in time (e.g., Feb. 3, 2018, after 400 hours of flight, etc.). A first instruction of the set of instructions may be determined based upon specifications of the first critical part, the plurality of sets of reliability indexes and the illustrations of the plurality of sets of illustrations. The first instruction may indicate that the first maintenance shall be performed on the first critical part by redirecting power to a critical region of the first critical part, by sending computer instructions over a network to the first critical part, by sending a software update to the first critical part, by sending equipment, tools, parts, etc. to the first critical part, by replacing the first critical part with a new and/or serviced part, by replacing a critical subpart of the first critical part with a new and/or serviced subpart wherein the critical subpart is determined to be defective or faulty, by performing the first maintenance on the first critical part before performing other maintenances on other parts based upon a priority of the first maintenance, by reassigning manpower, equipment, tools, parts, etc. assigned to perform other maintenances to performing the first maintenance based upon the priority of the first maintenance, by servicing the critical part, by modifying or changing the critical part, by inspecting the first critical part to determine one or more (e.g., other) maintenances to perform on the first critical part, etc.

At 414, maintenance of the part of the aircraft may be facilitated and supported based upon the reliability report (e.g., and/or the maintenance schedule). For example, responsive to presenting the set of instructions for performing maintenance on the one or more critical parts and/or assigning manpower, equipment, tools, parts, etc. to the one or more critical parts, maintenance may be performed on each critical part of the one or more critical parts at each point in time of the one or more points in time. For example, responsive to indicating the first maintenance to be performed on the first critical part at the first point in time, the first maintenance may be performed according to the maintenance schedule and/or the first instruction (e.g., of the set of instructions) corresponding to the first critical part.

In some examples, a maintenance machine (e.g., one or more devices configured to perform maintenance on one or more types of parts) may use the maintenance schedule to perform maintenance on critical parts (e.g., of the one or more types of parts). For example, the maintenance machine may receive reliability indexes and/or maintenance schedules from the device (e.g., and/or a second device) (e.g., periodically and/or responsive to various inputs), and/or the maintenance machine may perform reliability analyses (e.g., periodically and/or responsive to various inputs) using an internal computer and/or using a server. For example, the maintenance machine may receive one or more sets of information (e.g., corresponding to failure times of parts of the one or more types of parts) and perform one or more reliability analyses to identify the critical parts (e.g., using one or more techniques described herein). The maintenance machine may then scan for and/or find each critical part of the critical parts (e.g., automatically) and perform maintenance on each critical part based upon a set of instructions, priorities, etc. corresponding to the critical parts. For example, if a first priority of a first critical part is higher than a second priority of a second critical part, the maintenance machine may perform a first maintenance to the first critical part before performing a second maintenance to the second critical part. Additionally, the maintenance machine may perform maintenance of the critical parts with (e.g., assistance from) manpower, equipment, tools, parts, etc.

In some examples, one or more techniques presented herein may be performed automatically while monitoring the aircraft. For example, the comprehensive reliability analysis may be performed for the aircraft and other aircrafts periodically (e.g., daily, every other day, weekly, monthly, every other month, etc.). In this way, critical parts of the aircraft and the other aircrafts may be identified and indicated using notifications, reliability reports and/or maintenance schedules (e.g., generated based upon reliability analyses performed while monitoring the aircraft systems and the other aircrafts. In an example, a fleet of aircrafts of an airline may be monitored using the techniques presented herein. Accordingly, faulty or critical parts of aircraft may be identified and incidents and accidents involving the aircraft may be prevented by performing maintenance on those critical parts.

In some examples, the comprehensive reliability analysis may be performed and the reliability report may be generated without generating a maintenance schedule and/or without facilitating maintenance of the part of the aircraft.

It may be appreciated that the comprehensive reliability analysis is performed efficiently such that the comprehensive reliability analysis is performed using optimal processing and computing power. The comprehensive reliability analysis is performed in an optimal amount of time.

Figure 4B:
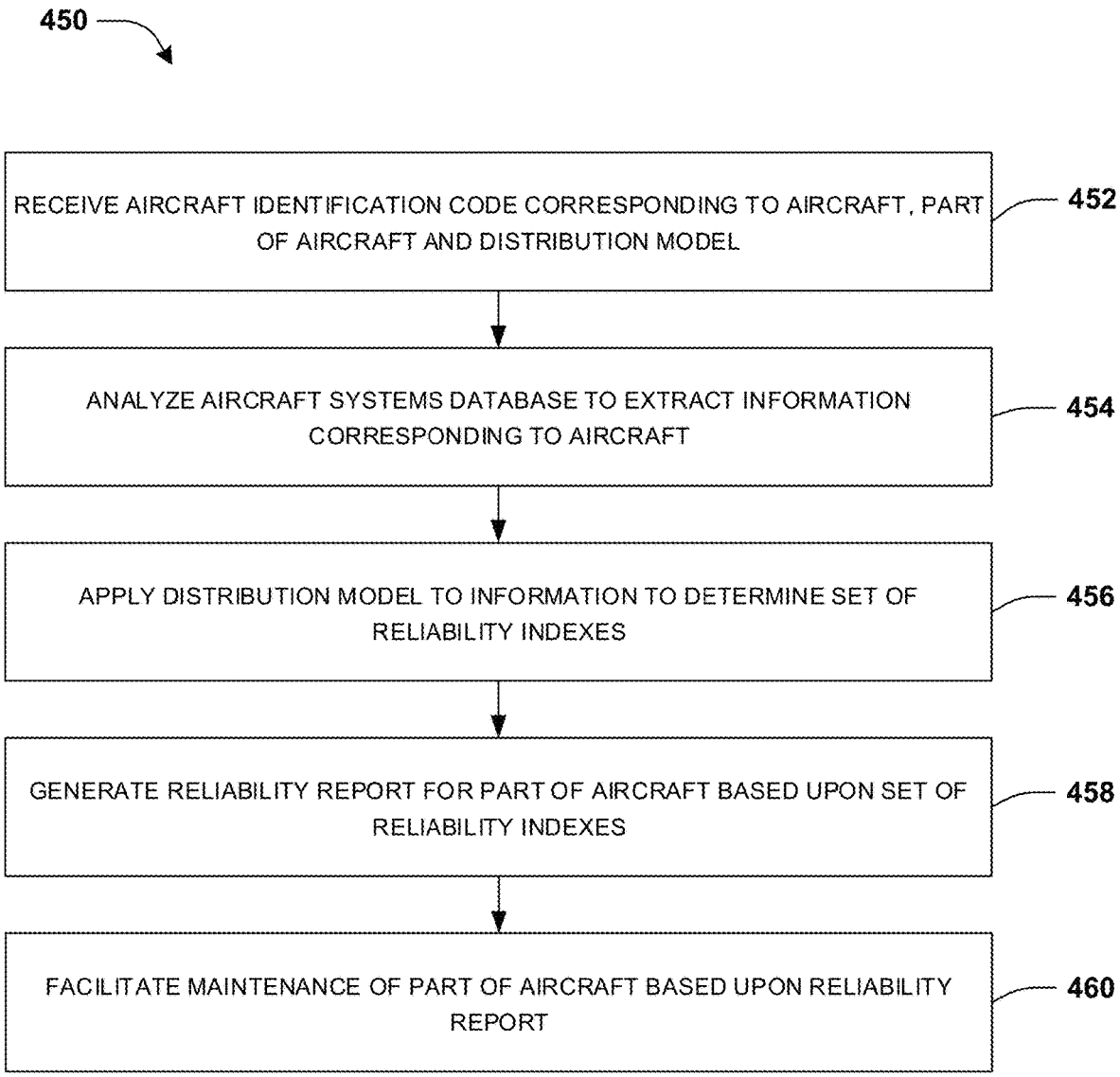
FIG. 4B is a flow chart illustrating an example method for performing a comprehensive reliability analysis of an aircraft.

An embodiment for performing a comprehensive reliability analysis of an aircraft system is illustrated by an example method 450 of FIG. 4B. In some examples, the comprehensive reliability analysis may be performed in a non-automatic mode (e.g., wherein one or more distribution models, one or more parts of the aircraft, etc. may be selected manually) called Non-Automatic Reliability Data Analysis (NARDA). In some examples, an option for performing the comprehensive reliability analysis in the non-automatic mode may be received via a selection of the non-automatic mode from a main menu system. For example, the main menu system comprising "ARDA" corresponding to automatic mode and "NARDA" corresponding to the non-automatic mode may be presented.

At 452, an aircraft identification code (e.g., registration number) corresponding to the aircraft, a part of the aircraft and a distribution model may be selected. The aircraft identification code may be selected via a selection of the aircraft identification code from a list of aircraft identification codes (e.g., presented via a combo box) corresponding to an aircraft type displayed by the device. The part of the aircraft may be selected via a selection of the part from one or more lists of parts of the aircraft via a combo box displayed by the device. In some examples, the part may comprise a system, sub-system, module or a component of the aircraft. The one or more lists of parts may comprise a first list of systems, a second list of parts. The second list of parts may be based upon a selection of a system from the first list of systems. The distribution model may be selected via a selection of the distribution model from a list of a plurality of distribution models (e.g., exponential distribution, Gamma distribution, Weibull distribution) displayed by the device. In some examples, a confidence coefficient (e.g., used for performing the comprehensive reliability analysis) may be selected via a textbox in a GUI.

At 454, an aircraft systems database may be analyzed to extract information corresponding to the aircraft. In some examples, the aircraft systems database may be managed, maintained and/or edited using a DMU. In some examples, the information may comprise failure times associated with the part of the aircraft and/or one or more other selected parts of the aircraft (e.g., selected for undergoing the comprehensive reliability analysis). At 456, the (e.g., selected) distribution model may be applied to the information to determine a set of reliability indexes (e.g., using an SCE). In some examples, a set of confidence intervals may be computed corresponding to the set of reliability indexes. In some examples, an estimation method may be performed based upon the distribution model and the information to determine parameters corresponding to the distribution model. In some examples, the estimation method may comprise MLE. In some examples, the set of reliability indexes may be determined based upon an estimated distribution model corresponding to one or more estimations of the parameters of the distribution model. For example, a plurality of goodness-of-fit tests may be performed based upon the information and the estimated distribution model to generate a plurality of results of the plurality of goodness-of-fit tests. In some examples, the plurality of goodness-of-fit tests may be performed using a plurality of significance levels (e.g., alpha levels such as 0.25, 0.15, 0.1, 0.05, 0.025, 0.01, etc.) based upon a plurality of statistics (e.g., D, $D^+$, $D^-$, V, W2, A2, etc.).

In some examples, the information (e.g., extracted from the aircraft systems database) and the set of reliability indexes may correspond to a set of failures of the part of the aircraft. In some examples, the set of failures may comprise failures from a first failure of the part to a last failure of the part. In some examples, the set of confidence intervals and a set of statistical characteristics may be determined corresponding to the set of failures of the part.

At 458, a reliability report may be generated for the part of the aircraft based upon the set of reliability indexes. In some examples, the reliability report may comprise the set of reliability indexes, the set of confidence intervals and the set of statistical characteristics. The reliability report may comprise illustrations and summaries representing the set of reliability indexes, the set of confidence intervals and the set of statistical characteristics.

In some examples, a maintenance schedule for the part of the aircraft system may be developed by a maintenance unit based upon the reliability report, the set of the reliability indexes and the illustrations. For example, the set of reliability indexes of the part may indicate that the part may have the potential of endangering safety of flight of the aircraft and/or may indicate maintenance to be performed (e.g., replacing the part, repairing the part, inspecting the part, servicing the part, etc.) on the part at a point in time. Accordingly, the maintenance schedule may be developed comprising details for maintenance performed on the part. The details may comprise an instruction for performing the maintenance on the part based upon specifications of the part and/or the set of reliability indexes of the part. The instruction may comprise an assignment of manpower, equipment, tools, parts, etc. to the part and/or a priority (e.g., importance, urgency, etc.) of the instruction. For example, the maintenance schedule may indicate that the maintenance shall be performed on the part at the point in time (e.g., Jul. 8, 2018, after 900 hours of flight). At 460, maintenance of the part of the aircraft system may be facilitated based upon the maintenance schedule. For example, responsive to presenting the instruction for performing the maintenance on the part and/or assigning manpower, equipment, tools, parts, etc. to the part, the maintenance may be performed on the part at the point in time.

In some examples, the comprehensive reliability analysis may be performed and the reliability report may be generated without generating a maintenance schedule and/or without facilitating maintenance of the part of the aircraft system. For example, the comprehensive reliability analysis may be performed in the non-automatic mode in order to determine differences in reliability indexes (e.g., and/or other results) determined by performing various reliability analyses using different distribution models, and comparing those differences. Additionally, the comprehensive reliability analysis may be performed in the non-automatic mode in order to determine differences in reliability indexes (e.g., and/or other results) determined using the non-automatic mode with the reliability indexes (e.g., and/or other results) determined using the automatic mode and comparing those differences (e.g., and evaluating performance of a second comprehensive reliability analysis using the automatic mode).

Figure 5:
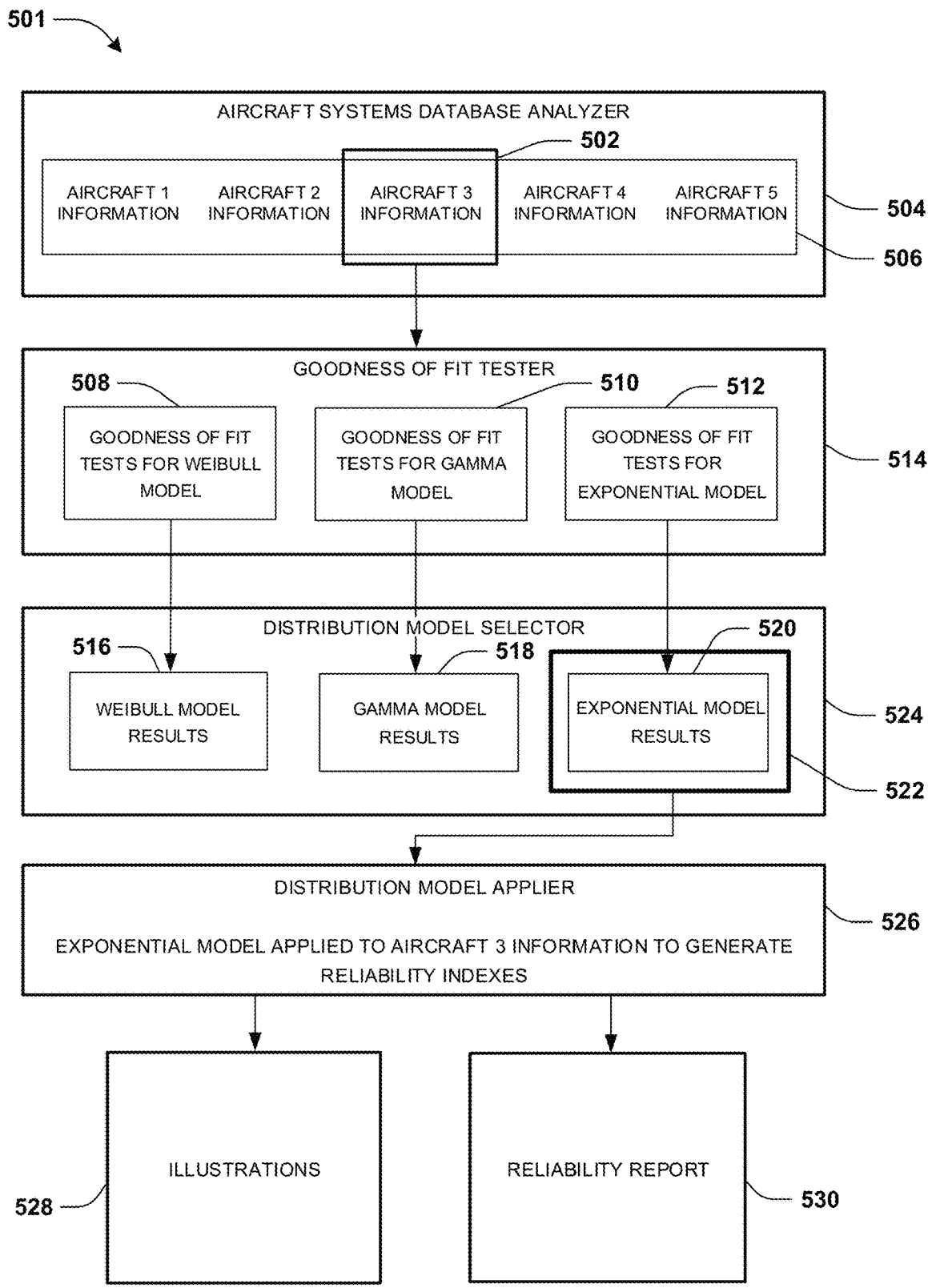
FIG. 5 is a component block diagram illustrating an example system for performing a comprehensive reliability analysis of an aircraft.

FIG. 5 illustrates an example of a system 501 for performing a comprehensive reliability analysis of an aircraft. In some examples, an aircraft identification code (e.g., registration number) corresponding to the aircraft may be selected. An aircraft systems database 506 may be analyzed by an aircraft systems database analyzer 502 to extract information 502 corresponding to the aircraft. In some examples, the aircraft systems database analyzer 502 may be a part of a DMU. A goodness-of-fit tester 514 may (e.g., then) perform a first set of goodness-of-fit tests 508 based upon the information 502 using a first distribution model (e.g., Weibull model) to generate a first set of results 516. Additionally, the goodness-of-fit tester 514 may perform a second set of goodness-of-fit tests 510 based upon the information 502 using a second distribution model (e.g., Gamma model) to generate a second set of results 518. Additionally, the goodness-of-fit tester 514 may perform a third set of goodness-of-fit tests 512 based upon the information 502 using a third distribution model (e.g., exponential model) to generate a third set of results 520. In some examples, the goodness-of-fit tester 514 may be a part of an SCE.

A distribution model selector 524 may analyze the first set of results 516, the second set of results 518 and the third set of results 520 to select a distribution model associated with a fit establishing a criteria. For example, the fit may be associated with a number of acceptances of a null hypothesis exceeding a threshold (e.g., and/or a maximum number of acceptances of the null hypothesis). For example, a first fit associated with the first set of results 516, a second fit associated with the second set of results 518 and a third fit associated with the third set of results 520 may be ranked based upon numbers of acceptances of the null hypothesis across the first distribution model, the second distribution model and the third distribution model. In some examples, the distribution model selector 524 may perform a selection 522 of the third distribution model responsive to determining that the third fit is ranked higher than the second fit and the first fit (e.g., and/or that the third fit is associated with the maximum number of acceptances of the null hypothesis). In some examples, the distribution model selector 524 may be part of the SCE. A distribution model applier 526 may apply the third distribution model to the information 502 to determine a set of reliability indexes. In some examples, the distribution model applier 526 may use an estimation method (e.g., MLE) based upon the third distribution model and the information 502 to determine one or more estimations of one or more parameters corresponding to the third distribution model. In some examples, the reliability indexes may be determined based upon the one or more estimations. In some examples, the distribution model applier 526 may be part of the SCE. A reliability report 530 and/or illustrations 528 may be generated based upon a plurality of sets of reliability indexes determined by repeating processes of the comprehensive reliability analysis for a plurality of sets of information corresponding to systems of the aircraft.

Figure 6:
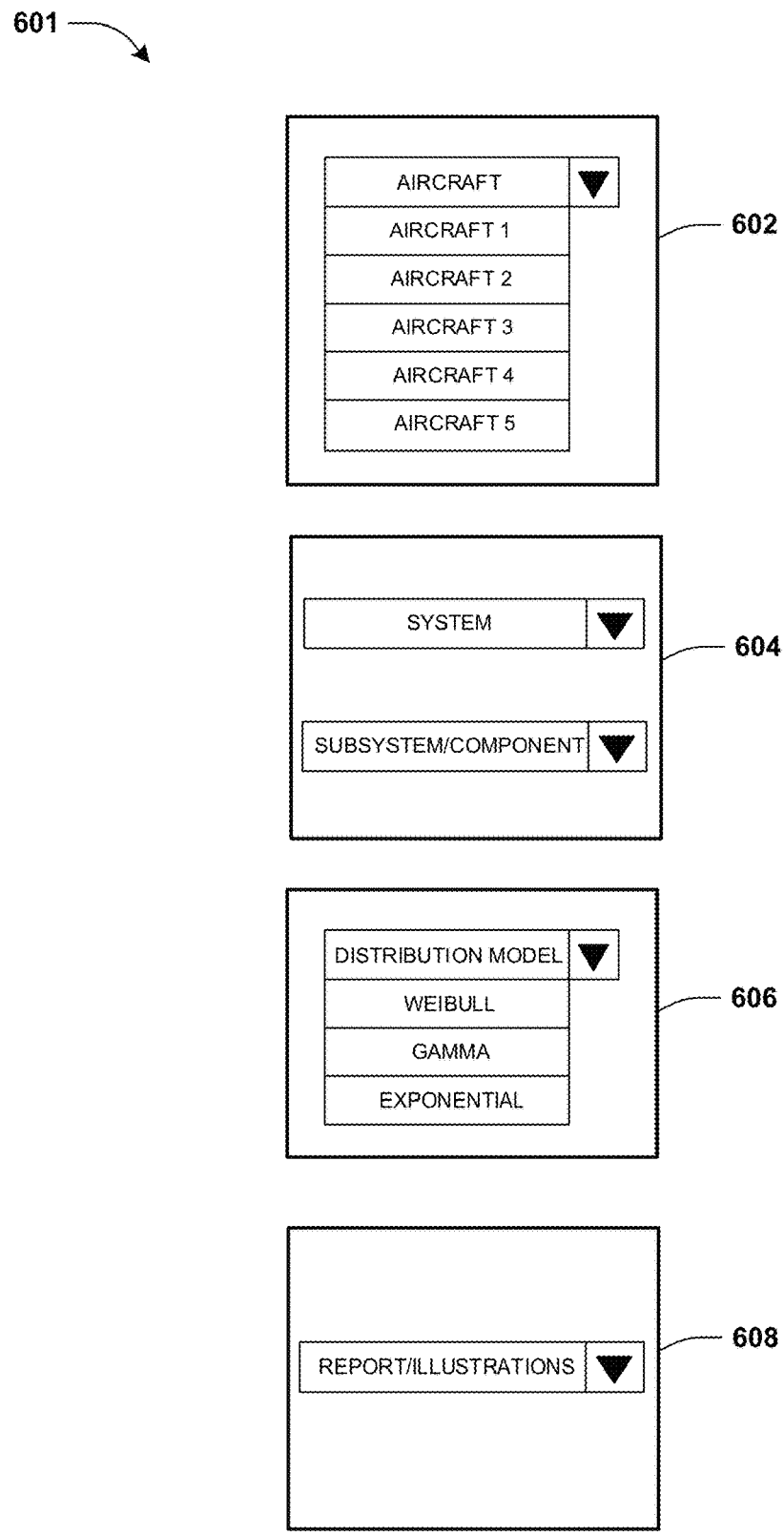
FIG. 6 is a component block diagram illustrating an example system for presenting a plurality of graphical objects used for facilitating the receipt of a plurality of inputs.

FIG. 6 illustrates an example of a system 601 for presenting a plurality of graphical objects used for facilitating the receipt of a plurality of inputs. A first graphical object 602 comprises a combo box configured for receiving an aircraft identification code corresponding to an aircraft. For example, the combo box may comprise a text area (e.g., comprising "AIRCRAFT") and a drop-down list comprising aircraft identification codes. In some examples, responsive to selecting an item from the combo box, the aircraft identification code may be selected from the drop-down list.

A second graphical object 604 comprises a first menu system configured for selecting a system of the aircraft, a second sub-menu configured for selecting a sub-system or a component of the aircraft. In some examples, responsive to selecting a selection of the first menu system, a list of systems of the aircraft is presented via a drop-down menu. The system may be selected via a selection of the system from the list of systems. In some examples, responsive to receiving a selection of the sub-menu, a list of sub-systems and components is presented via a drop-down sub-menu. The sub-system or the component may be selected via a selection of the sub-system or the component from the second list of sub-systems and components in the submenu. The list of sub-systems may be based upon the selection of the system.

A third graphical object 606 comprises a menu system configured for selecting a distribution model (e.g., to be applied to information corresponding to the aircraft system). For example, the menu system may comprise a label (e.g., comprising "DISTRIBUTION MODEL") and a drop-down menu comprising distribution models. In some examples, responsive to selecting the label, the user may select the distribution model.

A fourth graphical object 608 comprises a menu system configured for text box configured for selecting one or more options for a reliability report and/or illustrations generated during the comprehensive reliability analysis. In some examples, the menu system may comprise a label (e.g., comprising "REPORT/ILLUSTRATIONS"). Responsive to selecting the label, a list of options corresponding to the reliability report and/or the illustrations may be presented. A type of reliability report, one or more sections of the reliability report and/or a type of illustration may be selected from a list of options displayed.

Figure 7A:
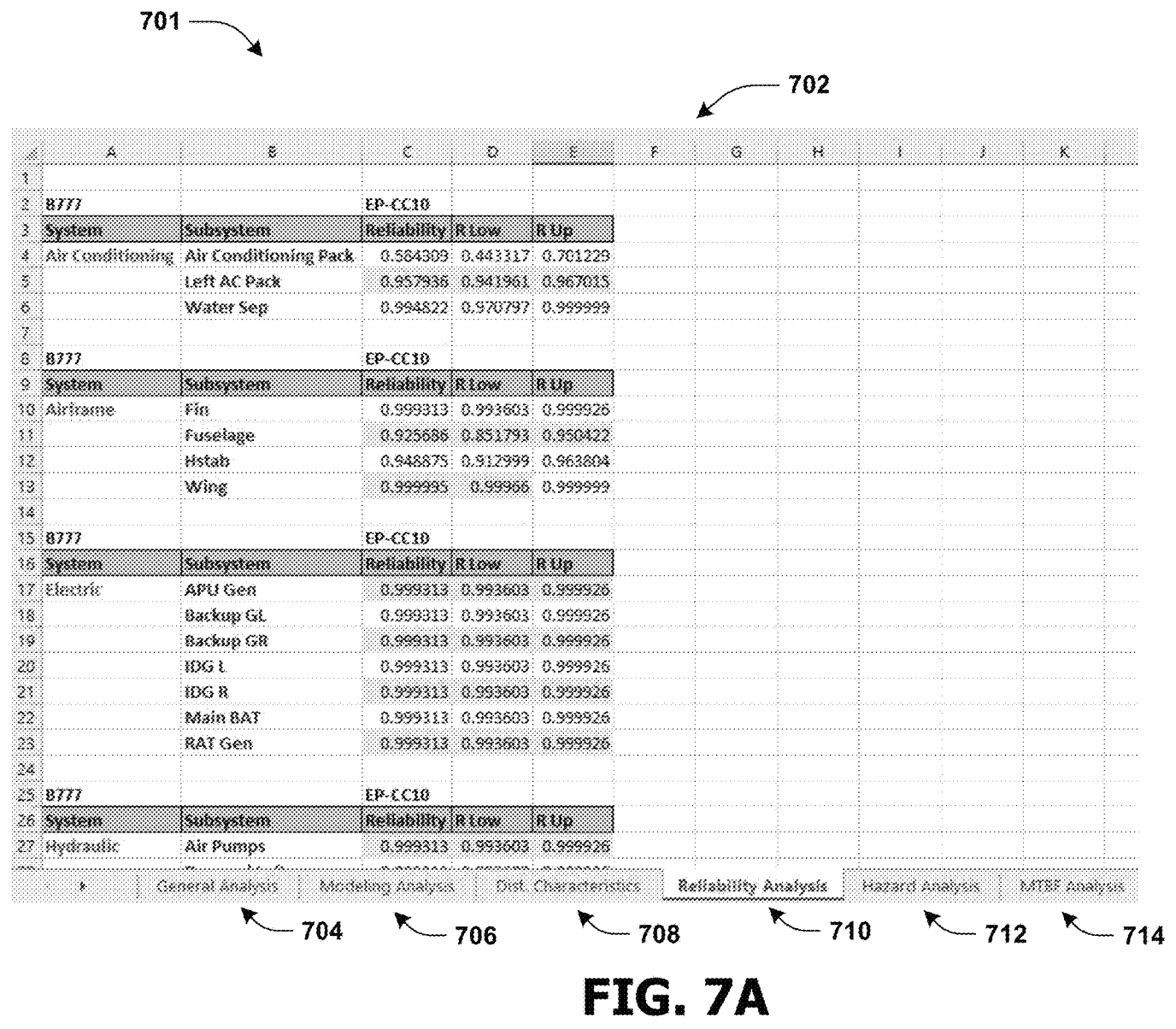
Figure 7B:
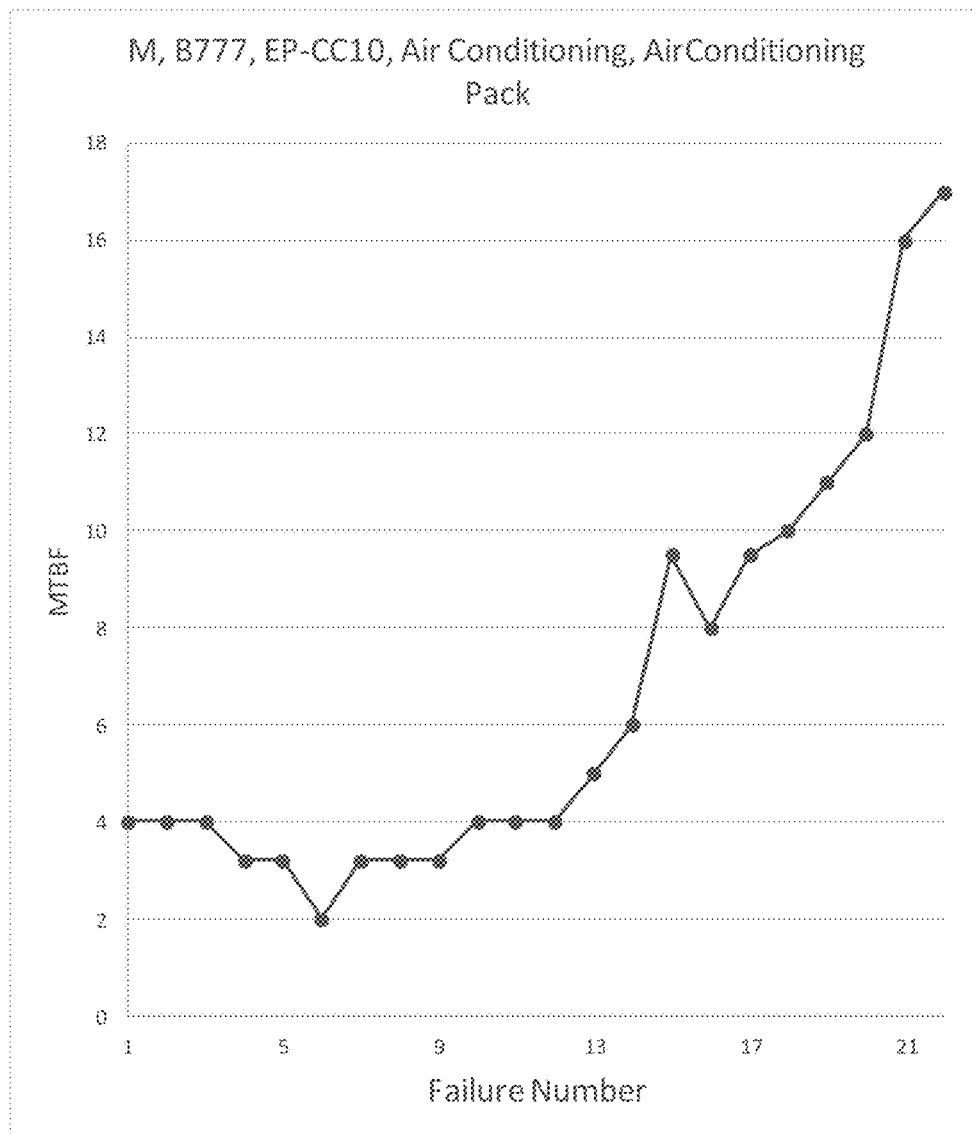
FIG. 7B is a diagram illustrating an example system for presenting a reliability report and illustrations, where a chart, generated by a monitoring component of software performing a comprehensive reliability analysis, corresponding to a plurality of failures of a part of an aircraft is presented.

FIGS. 7A-7B illustrate examples of a system 701 for presenting a reliability report and illustrations. FIG. 7A illustrates an example for presenting a table 702 comprising a plurality of statistical characteristics, a plurality of reliability indexes and a plurality of confidence intervals corresponding to a plurality of parts of a Boeing B777 aircraft system. The table 702 may be within the reliability report. The plurality of reliability indexes may comprise a plurality of reliability point estimations. The plurality of parts may comprise a first set of sub-systems of a first system "Air Conditioning" of the Boeing B777 aircraft system and a second set of sub-systems of a second system "Airframe" of the Boeing B777 aircraft. The table 702 may comprise a plurality of sections. For example, a first section of the table 702 may comprise a first set of estimations of reliability indexes (e.g., reliability point estimations) and a first set of confidence intervals corresponding to the first set of sub-systems. The first set of sub-systems may comprise a first sub-system "Air Conditioning Pack", a second sub-system "Left AC Pack" and a third sub-system "Water Sep". The table 702 indicates that a first reliability point estimation for the first sub-system is 0.584309 and a corresponding confidence interval is 0.443317 to 0.701229, a second reliability point estimation for the second sub-system is 0.957936 and a corresponding confidence interval is 0.941961 to 0.967015 and a third reliability point estimation for the third sub-system is 0.994822 and a corresponding confidence interval is 0.970797 to 0.999999. A second section of the table 702 may comprise a second set of reliability point estimations and a second set of confidence intervals corresponding to the second set of sub-systems. In some examples, a plurality of tabs may be displayed to facilitate navigation through the reliability report. For example, a first tab 704 may be linked to a first section of the reliability report comprising a "General Analysis" report. A second tab 706 may be linked to a second section of the reliability report comprising a "Modeling Analysis" report. A third tab 708 may be linked to a third section of the reliability report comprising a "Dist. Characteristics" report. A fourth tab 710 may be linked to a fourth section of the reliability report comprising a "Reliability Analysis" report. A fifth tab 712 may be linked to a fifth section of the reliability report comprising a "Hazard Analysis" report. A sixth tab 714 may be linked to a sixth section of the reliability report comprising an "MTBF Analysis" report.

FIG. 7B illustrates an example for presenting an illustration 752 comprising a chart of a plurality of reliability indexes corresponding to a plurality of failures corresponding to a part of the Boeing B777 aircraft system. The illustration 752 may be generated by a monitoring component of software performing a comprehensive reliability analysis. The part may comprise the first sub-system (e.g., "Air Conditioning Pack" of the first system (e.g., "Air Conditioning") of the Boeing B777 aircraft system. The horizontal axis may comprise the plurality of failures comprising failures from an initial failure to a last failure and the vertical axis may comprise a plurality of MTBFs corresponding to the plurality of failures. In some examples, safety or performance and/or a reliability of the first sub-system may be determined based upon the plurality of MTBFs, wherein a value of an MTBF may have a direct relationship with the safety, the performance and/or the reliability of the first sub-system. For example, a first MTBF corresponding to a first failure may be equal to a first number "4". A twenty-second MTBF corresponding to a twenty-second failure may be equal to a second number "17". Accordingly, the safety, the performance or the reliability of the first sub-system may be higher after the twenty-second failure than the safety, the performance or the reliability of the first sub-system after the first failure. Alternatively, a rate of increase of MTBFs between failures has a direct relationship with an increase or an improvement of the safety, the performance and/or the reliability of the first sub-system. For example, the rate of increase of MTBFs between the first failure and a second failure is equal to a third number "0". The rate of increase of MTBFs between a twentieth failure and a twenty first failure is equal to a fourth number "4". Accordingly, the increase (e.g., or the improvement) of the safety or reliability of the first sub-system is greater between the twentieth failure and the twenty first failure than between the first failure and the second failure. Additionally, a rate of decrease of MTBFs between failures has a direct relationship with a decrease (e.g., or decline) of the safety, the performance or the reliability of the first sub-system. In some examples, other illustrations may further be generated for estimations of reliability indexes (e.g., reliability point estimations) corresponding to the plurality of failures, hazard rates corresponding to the plurality of failures and MTBFs corresponding to the plurality of failures.

In some examples, at least some of the disclosed subject matter may be implemented on a client device (e.g., a device of a user), and in some examples, at least some of the disclosed subject matter may be implemented on a server (e.g., hosting a service accessible via a network). Additionally, it may be appreciated that at least some of one or more of the disclosed techniques, scenarios, etc. may be combined with at least some of one or more of the other disclosed techniques, scenarios, etc.

Figure 8:
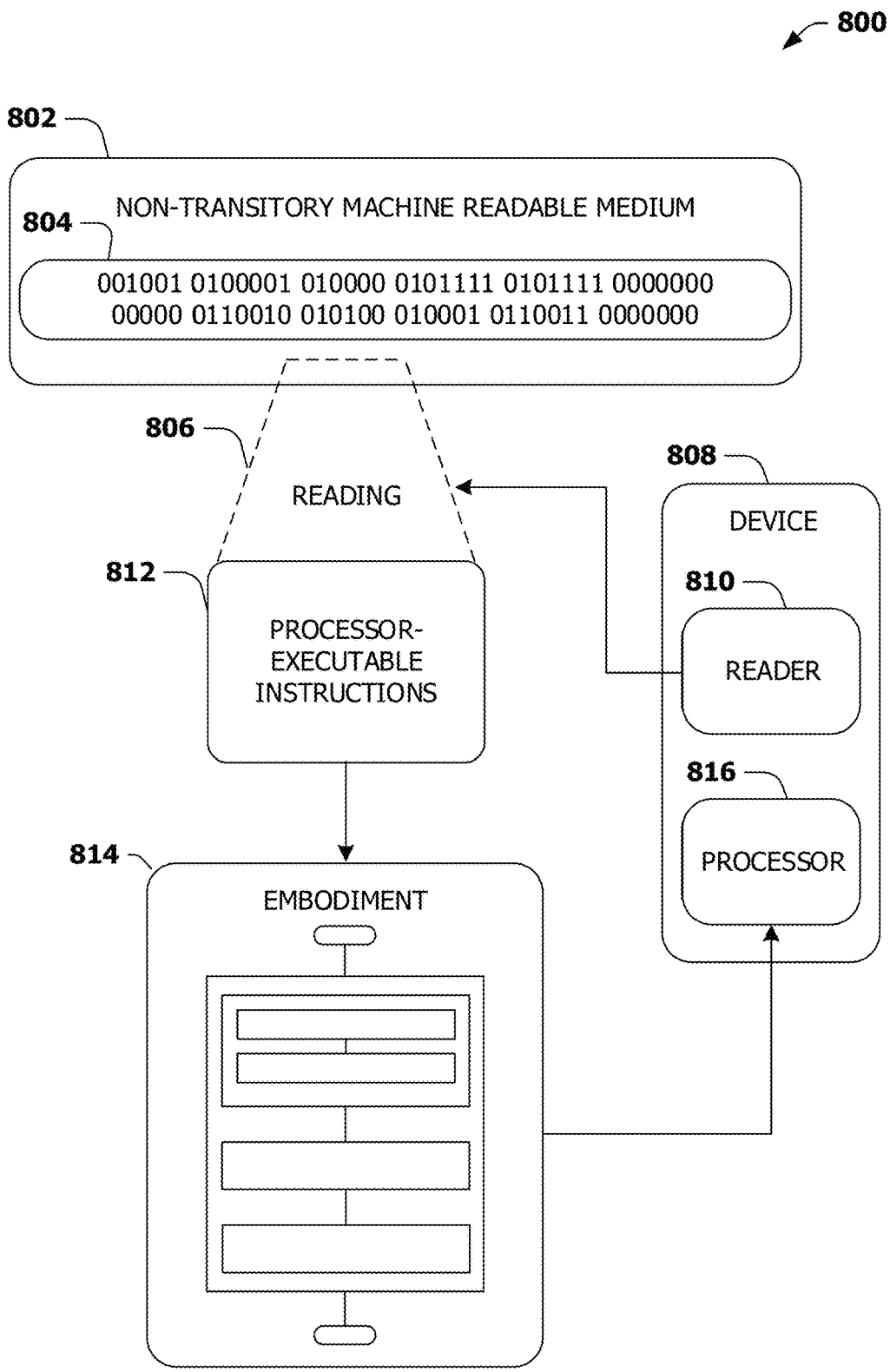
FIG. 8 is an illustration of a scenario featuring an example non-transitory machine readable medium in accordance with one or more of the provisions set forth herein.

FIG. 8 is an illustration of a scenario 800 involving an example non-transitory machine readable medium 802. The non-transitory machine readable medium 802 may comprise processor-executable instructions 812 that when executed by a processor 816 cause performance (e.g., by the processor 816) of at least some of the provisions herein. The non-transitory machine readable medium 802 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 802 stores computer-readable data 804 that, when subjected to reading 806 by a reader 810 of a device 808 (e.g., a read head of a hard disk drive, or a read operation invoked on a solid-state storage device), express the processor-executable instructions 812. In some embodiments, the processor-executable instructions 812, when executed, cause performance of operations, such as at least some of the example method 400 of FIG. 4A and the example method 450 of FIG. 4B, for example. In some embodiments, the processor-executable instructions 812 are configured to cause implementation of a system, such as at least some of the example system 501 of FIG. 5, the example system 601 of FIG. 6 and the example system 701 of FIGS. 7A-7B, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method for performing a comprehensive reliability analysis of an aircraft, comprising:
   analyzing an aircraft systems database to extract information corresponding to an aircraft;
   performing a plurality of goodness-of-fit tests based upon the information using a plurality of statistics and a plurality of significance levels to generate a plurality of results of the plurality of goodness-of-fit tests;
   analyzing the plurality of results to determine a distribution model associated with a fit establishing a criteria;
   applying the distribution model to the information to determine a set of reliability indexes;
   generating a reliability report for a part of the aircraft based upon the set of reliability indexes;
   generating a maintenance schedule for the part of the aircraft based upon the reliability report; and
   at least one of replacing, repairing, inspecting or servicing the part of the aircraft based upon the maintenance schedule.

2. The method of claim 1, the applying the distribution model to the information to determine the set of reliability indexes comprising:
   performing an estimation method based upon the distribution model and the information to determine one or more estimations of one or more parameters corresponding to the distribution model; and
   determining the set of reliability indexes based upon the one or more estimations and the information.

3. The method of claim 2, wherein the estimation method comprises maximum likelihood estimation.

4. The method of claim 1, the determining the distribution model comprising:
   ranking a plurality of fits of a plurality of distribution models based upon the plurality of results; and
   selecting the distribution model from the plurality of distribution models responsive to determining that the fit of the distribution model is ranked higher than one or more fits of one or more distribution models of the plurality of distribution models.

5. The method of claim 4, wherein the plurality of distribution models comprises an exponential distribution, a Gamma distribution and a Weibull distribution.

6. The method of claim 1, comprising:
   performing a first goodness-of-fit test of the plurality of goodness-of-fit tests using a first statistic of the plurality of statistics and a first significance level of the plurality of significance levels;
   performing a second goodness-of-fit test of the plurality of goodness-of-fit tests using the first statistic of the plurality of statistics and a second significance level of the plurality of significance levels; and
   performing a third goodness-of-fit test of the plurality of goodness-of-fit tests using a second statistic of the plurality of statistics and the first significance level of the plurality of significance levels.

7. The method of claim 1, wherein the set of reliability indexes comprises at least one of a reliability point estimation, a hazard rate or a mean time between failures.

8. The method of claim 1, comprising:
   determining a set of confidence intervals corresponding to the set of reliability indexes wherein a confidence interval of the set of confidence intervals corresponding to a reliability index of the set of reliability indexes is determined based upon a confidence coefficient.

9. The method of claim 8, comprising:
   determining the confidence coefficient manually before performing the comprehensive reliability analysis.

10. The method of claim 8, comprising:
    the reliability report generated comprising the set of reliability indexes and the set of confidence intervals; and
    presenting the reliability report.

11. The method of claim 10, the information and the set of reliability indexes corresponding to a first set of failures of the part of the aircraft, comprising:
    analyzing the aircraft systems database to extract second information corresponding to a newly recorded failure of the part of the aircraft; and
    determining a second set of reliability indexes based upon the information and the second information.

12. The method of claim 11, comprising:
    analyzing the aircraft systems database to extract third information corresponding to a second part of the aircraft; and
    determining a third set of reliability indexes based upon the third information, where the reliability report comprises the third set of reliability indexes.

13. The method of claim 1, comprising at least one of:
    performing the comprehensive reliability analysis responsive to receiving one or more inputs, the one or more inputs comprising an aircraft identification code corresponding to the aircraft, one or more parts of the aircraft, a one or more distribution models and a confidence coefficient; or
    performing the reliability analysis automatically.

14. The method of claim 1, comprising:
    monitoring the aircraft based upon one or more comprehensive reliability analyses comprising the comprehensive reliability analysis to identify potentially hazardous parts and faulty parts of the aircraft.

15. A computing device comprising:
    a processor; and
    memory comprising processor-executable instructions that when executed by the processor cause performance of operations for performing a reliability analysis and monitoring of aircraft systems, the operations comprising:
        receiving an aircraft identification code corresponding to an aircraft, a part of the aircraft and a distribution model;
        analyzing an aircraft systems database to extract information corresponding to the aircraft;
        applying the distribution model to the information to determine a set of reliability indexes;
        generating a reliability report for the part of the aircraft based upon the set of reliability indexes; and
        generating a maintenance schedule for the part of the aircraft based upon the reliability report, wherein the maintenance schedule is used to at least one of replace, repair, inspect or service the part of the aircraft.

16. The computing device of claim 15, the applying the distribution model to the information to determine the set of reliability indexes comprising:
    performing an estimation method based upon the distribution model and the information to determine one or more estimations of one or more parameters corresponding to the distribution model; and
    determining the set of reliability indexes based upon the one or more estimations and the information.

17. The computing device of claim 16, wherein the estimation method comprises maximum likelihood estimation.

18. The computing device of claim 15, wherein the set of reliability indexes comprises at least one of a reliability point estimation, a hazard rate or a mean time between failures.

19. The computing device of claim 15, the operations comprising:
   determining a set of confidence intervals corresponding to the set of reliability indexes wherein a confidence interval of the set of confidence intervals corresponding to a reliability index of the set of reliability indexes is determined based upon a confidence coefficient.

20. A non-transitory machine readable medium having stored thereon processor-executable instructions that when executed cause performance of operations, the operations comprising:
   analyzing an aircraft systems database to extract information corresponding to an aircraft;
   performing a plurality of goodness-of-fit tests based upon the information using a plurality of statistics and a plurality of significance levels to generate a plurality of results of the plurality of goodness-of-fit tests;
   analyzing the plurality of results to determine a distribution model associated with a number of acceptances of a null hypothesis exceeding a threshold;
   applying the distribution model to the information to determine a set of reliability indexes; and
   generating a maintenance schedule for a part of the aircraft based upon the set of reliability indexes, wherein the maintenance schedule is used to at least one of replace, repair, inspect or service the part of the aircraft.

* * * * *